United States Patent
Nishida et al.

(10) Patent No.: US 7,998,312 B2
(45) Date of Patent: Aug. 16, 2011

(54) MOISTURE ABSORPTIVE AND DESORPTIVE PAPER AND A METHOD FOR MANUFACTURING THE SAME

(75) Inventors: Ryosuke Nishida, Setouchi (JP); Hideo Naka, Okayama (JP)

(73) Assignee: Japan Exlan Company Limited, Osaka (JP)

( * ) Notice: Subject to any disclaimer, the term of this patent is extended or adjusted under 35 U.S.C. 154(b) by 767 days.

(21) Appl. No.: 10/587,147

(22) PCT Filed: Nov. 29, 2004

(86) PCT No.: PCT/JP2004/017700
§ 371 (c)(1),
(2), (4) Date: Jul. 24, 2006

(87) PCT Pub. No.: WO2005/085523
PCT Pub. Date: Sep. 15, 2005

(65) Prior Publication Data
US 2007/0158043 A1    Jul. 12, 2007

(30) Foreign Application Priority Data
Mar. 3, 2004 (JP) .................................. 2004-059188

(51) Int. Cl.
*D21H 17/10* (2006.01)
*D21H 13/18* (2006.01)
*D21H 13/36* (2006.01)

(52) U.S. Cl. ...... 162/145; 162/141; 162/151; 162/157.2; 162/158; 162/164.1; 162/168.1; 428/221

(58) Field of Classification Search .................. 162/141, 162/145, 151, 157.2, 158, 164.1, 168.1; 428/221
See application file for complete search history.

(56) References Cited

U.S. PATENT DOCUMENTS

| | | | | |
|---|---|---|---|---|
| 4,312,907 | A | * | 1/1982 | Hiraoka et al. ............... 428/212 |
| 5,691,421 | A | * | 11/1997 | Tanaka et al. .............. 525/329.2 |
| 5,791,153 | A | * | 8/1998 | Belding et al. .................... 62/93 |
| 6,046,119 | A | | 4/2000 | Kaibe et al. |
| 6,080,797 | A | * | 6/2000 | Nishida ........................... 521/64 |
| 6,143,390 | A | * | 11/2000 | Takamiya et al. ............... 428/90 |
| 6,387,970 | B1 | * | 5/2002 | Nishida ........................... 521/64 |
| 6,429,265 | B2 | * | 8/2002 | Nishida ...................... 525/329.5 |
| 2002/0055581 | A1 | * | 5/2002 | Lorah et al. ................... 524/445 |

FOREIGN PATENT DOCUMENTS

| | | |
|---|---|---|
| EP | 0 933 467 A2 | 8/1999 |
| JP | 61-282465 | 12/1986 |
| JP | 6-207398 | 7/1994 |
| JP | 10-212692 | 8/1998 |
| JP | 11-81188 | 3/1999 |
| JP | 2000-129574 | 5/2000 |
| JP | 2002-30553 | 1/2002 |

* cited by examiner

*Primary Examiner* — Matthew Daniels
*Assistant Examiner* — Dennis Cordray
(74) *Attorney, Agent, or Firm* — Wenderoth, Lind & Ponack, L.L.P.

(57) ABSTRACT

Moisture absorptive and desorptive paper having both high moisture absorptive and desorptive properties and high dimensional stability is provided. Moisture absorptive and desorptive paper comprising organic fine particles having cross-linking structure and 1 to 10 mmol/g of acidic group where not less than 1 mmol/g of metal ion of at least one kind of metal selected from the group consisting of Li, Na, K, Mg and Ca is bonded to said acidic group, inorganic fiber and pulp-shaped fiber. By the basic constitution as above, on one hand the moisture absorptive and desorptive properties inherent to the organic fine particles are efficiently utilized by suppressing the use of binder as much as possible, and on the other hand deformation or thermal shrinking of the paper due to swelling in water at the time of absorption etc. is able to be suppressed.

10 Claims, No Drawings

MOISTURE ABSORPTIVE AND DESORPTIVE PAPER AND A METHOD FOR MANUFACTURING THE SAME

This application is a 371 of PCT/JP2004/017700, filed Nov. 29, 2004 and claims priority to Japanese Application No. 2003-059188, filed Mar. 3, 2004.

TECHNICAL FIELD OF THE INVENTION

The present invention relates to moisture absorptive and desorptive paper whereby both high moisture absorptive and desorptive properties and high dimensional stability are available and a method for manufacturing the same.

BACKGROUND ART

Many researches and developments have been carried out already for moisture absorptive and desorptive paper or, in other words, paper having moisture absorptive and desorptive properties, and the products where substances having moisture absorptive and desorptive properties are contained in paper have been well known. With regard to substance having moisture absorptive and desorptive properties, fibers having moisture absorptive and desorptive properties and fine particles having moisture absorptive and desorptive properties have been much used. As to substances having moisture absorptive and desorptive properties as such, those of organic type and inorganic type are usually available, and there are characteristics that the former has high moisture absorptive and desorptive properties but is swollen while the latter is not swollen although it has little moisture absorptive amount. Therefore, it is not easy to prepare moisture absorptive and desorptive paper in which both high moisture absorptive and desorptive properties and high dimensional stability are available.

With regard to moisture absorptive and desorptive paper where fibers having moisture absorptive and desorptive properties are utilized, there have been known moisture absorptive and desorptive paper comprising a moisture absorptive and desorptive fiber prepared by introduction of cross-linking bond and carboxyl group into an acrylate fiber followed by adding sodium ion thereto, a polyester binder fiber and a conifer pulp, etc. (refer to Japanese Patent Laid-Open No. 06/207398). Since the above-mentioned moisture absorptive and desorptive fiber is able to contain much carboxyl group, it has good moisture absorptive and desorptive properties. Further, since swelling of the above-mentioned moisture absorptive and desorptive fiber is able to be much more suppressed than the ordinary moisture absorptive and desorptive fibers, due to the cross-linking bond, when it is used in small quantity, dimensional stability of the moisture absorptive and desorptive paper is able to be maintained. However, when its using amount is increased for preparing moisture absorptive and desorptive paper having high moisture absorptive and desorptive properties, the resulting suppressive action for swelling is not sufficient and lowering in its dimensional stability is unavoidable. Accordingly, in the moisture absorptive and desorptive paper disclosed in said document, improvement in the dimensional stability is attempted by the use of large amount of binder fiber or by the application of a hot press after making into paper. However, when the binder fiber is used in large amount, the moisture absorptive and desorptive fiber is covered with a fused binder fiber and bound, whereby even when the moisture absorptive and desorptive properties inherent to the moisture absorptive and desorptive fiber are good, the expected properties are unable to be well achieved and it is difficult to enhance the moisture absorptive and desorptive properties as the moisture absorptive and desorptive paper.

With regard to examples where fine particles having moisture absorptive and desorptive properties are used, there have been known moisture absorptive and desorptive paper comprising inorganic particles such as silica gel or zeolite, wood pulp and thermally adhesive fiber, etc. (refer to Japanese Patent Laid-Open No. 10/212,692). Said moisture absorptive and desorptive paper is not swollen even when inorganic particles playing a role of moisture absorptive and desorptive properties such as silica gel or zeolite absorbs moisture, whereby it is satisfactory in terms of dimensional stability. However, as mentioned already, since inorganic particles have small moisture-absorbing amount, it is difficult to prepare moisture absorptive and desorptive paper having high moisture absorptive and desorptive properties and, in addition, there is a disadvantage that moisture absorptive rate is slow, high temperature is needed for moisture desorption, or the particles are crushed upon repeated moisture absorption and desorption to lowering the properties, whereby its utilizing fields are limited.

DISCLOSURE OF THE INVENTION

Problem that the Invention is to Solve

As mentioned above, it is very difficult in the prior art to prepare moisture absorptive and desorptive paper where both high moisture absorptive and desorptive properties and high dimensional stability are available. An object of the present invention is to provide moisture absorptive and desorptive paper overcoming the disadvantages as such whereby both high moisture absorptive and desorptive properties and high dimensional stability are available and also to provide a method for manufacturing the same.

Means for Solving the Problems

The present inventors have carried out intensive studies for achieving the above-mentioned objects and, as a result, they have found that the using amount of a binder fiber is suppressed by adoption of inorganic fiber having a good dimensional stability, and that the moisture absorptive and desorptive properties of said organic fine particles is enhanced to the highest state even after making into paper by adopting organic fine particles having cross-linking structure and acidic group as a substance having moisture absorptive and desorptive properties and by means of improvement of paper manufacturing method. And based on these findings, the present inventors have succeed in obtaining moisture absorptive and desorptive paper which has both high moisture absorptive and desorptive properties and high dimensional stability, whereupon the present invention has now been achieved.

Thus, the present invention has been achieved by the following means.

(1) Moisture absorptive and desorptive paper, characterized in that, the paper comprises organic fine particles having cross-linking structure and 1 to 10 mmol/g of acidic group where not less than 1 mmol/g of metal ion of at least one kind of metal selected from the group consisting of Li, Na, K, Mg and Ca is bonded to said acidic group (hereinafter, that may be referred to as organic fine particles having cross-linking structure and acidic group), inorganic fiber and pulp-shaped fiber and a saturated moisture absorbing rate under the atmosphere of 20° C./65% RH is not less than 15%.

(2) The moisture absorptive and desorptive paper according to (1), wherein preparation of aqueous slurry containing the organic fine particles having the cross-linking structure and the acidic group, the inorganic fiber and the pulp-shaped fiber and manufacture of paper are conducted by the use of water where concentration of cation except metal ion bonded to the aforementioned acidic group is not more than 1 ppm.

(3) The moisture absorptive and desorptive paper according to (1), wherein aqueous liquid where the organic fine particles having the cross-linking structure and the acidic group are dispersed or emulsified in water in which concentration of cation except metal ion bonded to said acidic group is not more than 1 ppm is impregnated with paper comprising the inorganic fiber and the pulp-shaped fiber.

(4) The moisture absorptive and desorptive paper according to any of (1) to (3), wherein the organic fine particles having the cross-linking structure and the acidic group are moisture absorptive and desorptive fine particles of an acrylate type where fine particles of polymer of an acrylonitrile type are subjected to a treatment for introduction of cross-link by a hydrazine type compound and to a hydrolyzing treatment by an alkali metal salt.

(5) The moisture absorptive and desorptive paper according to any of (1) to (3), wherein the organic fine particles having the cross-linking structure and the acidic group are those having the cross-linking structure by divinylbenzene and carboxyl group.

(6) The moisture absorptive and desorptive paper according to any of (1) to (5), wherein the pulp-shaped fiber is a fibrillated acrylic fiber.

(7) The moisture absorptive and desorptive paper according to any of (1) to (6), wherein the content of the thermally adhesive fiber is not more than 20% by weight.

(8) The moisture absorptive and desorptive paper according to any of (1) to (7), wherein the swelling rate in water is not more than 50%.

(9) The moisture absorptive and desorptive paper according to any of (1) to (8), wherein a thermal shrinking rate is not more than 5%.

(10) A method for manufacture of moisture absorptive and desorptive paper, wherein the method includes a step for preparation of aqueous slurry and a step for manufacture of paper by using said aqueous slurry by a wet method, and wherein said aqueous slurry contains organic fine particles having a cross-linking structure and 1 to 10 mmol/g of acidic group where not less than 1 mmol/g of metal ion of at least one kind of metal selected from the group consisting of Li, Na, K, Mg and Ca is bonded to said acidic group, inorganic fiber and pulp-shaped fiber, characterized in that, water where concentration of cation excluding the metal ion bonded to the aforementioned acidic group is not more than 1 ppm is used.

(11) A method for the manufacture of moisture absorptive and desorptive paper, characterized in that, aqueous liquid in which organic fine particles having a cross-linking structure and 1 to 10 mmol/g of acidic group where not less than 1 mmol/g of metal ion of at least one kind of metal selected from the group consisting of Li, Na, K, Mg and Ca is bonded to said acidic group are dispersed or emulsified in water where concentration of cation excluding metal ion bonded to the aforementioned acid group is not more than 1 ppm is impregnated with paper comprising inorganic fiber and pulp-shaped fiber.

Advantages of the Invention

Since the moisture absorptive and desorptive paper of the present invention has both high moisture absorptive and desorptive properties and high dimensional stability, it is now possible to provide high moisture absorptive and desorptive properties even in the use where moisture absorptive and desorptive properties had to be suppressed for maintaining the size. In addition, since changes in the size by repetition of moisture absorption and desorption is small, durability of the moisture absorptive and desorptive paper itself is high and the paper is able to be suitably used as a moisture absorptive element for moisture desorptive air conditioners.

Best Mode for Carrying Out the Invention

The present invention will now be illustrated in detail as hereunder. The moisture absorptive and desorptive paper of the present invention is characterized in that it comprises organic fine particles having a cross-linking structure and 1 to 10 mmol/g of acidic group where not less than 1 mmol/g of metal ion of at least one kind of metal selected from the group consisting of Li, Na, K, Mg and Ca is bonded to said acidic group, inorganic fiber and pulp-shaped fiber.

The organic fine particles according to the present invention having the cross-linking structure and the acidic group are the main ingredient playing a role of the moisture absorptive and desorptive properties in the moisture absorptive and desorptive paper of the present invention. As to the acidic group, representative examples thereof are carboxyl group and sulfonic group. Those acidic groups are able to be introduced by copolymerization of a monomer containing those acidic groups in polymerization of polymer constituting the organic fine particles or, in the case of a carboxyl group, it is able to be introduced by hydrolysis after copolymerization of a monomer containing nitrile group or carboxylate group.

Amount of the acidic group in the organic fine particles having the cross-linking structure and the acidic group is 1 to 10 mmol/g, preferably 3 to 10 mmol/g and, still more preferably, 3 to 8 mmol/g. When the amount of the acidic group is less than 1 mmol/g, the metal ion which will be mentioned later is able to be bonded only in a small amount whereby no sufficient moisture absorptive and desorptive properties may be achieved while, when it is more than 10 mmol/g, there may cause problems such as swelling upon moisture absorption and desorption becomes vigorous whereby dimensional stability of the moisture absorptive and desorptive paper becomes insufficient.

It is also necessary that at least a part of the acidic group in the organic fine particles having cross-linking structure and acidic group is bonded to metal ion of at least one kind of metal selected from the group consisting of Li, Na, K, Mg and Ca. When such metal ion is adopted, it is possible to achieve high moisture absorptive and desorptive properties. Especially when sodium ion is adopted, a product having excellent saturated moisture absorbing amount is able to be prepared while, when potassium ion is adopted, a product having excellent moisture absorptive and desorptive speed is able to be prepared.

In order to achieve the moisture absorptive and desorptive properties, bonding amount of the above-mentioned metal ion is preferred to be not less than 1 mmol/g in total. Thus, when sodium ion and potassium ion are bonded, it is desired that total amount of sodium ion and potassium ion is not less than 1 mmol/g. The upper limit of the bonding amount is the maximum amount which is able to be bonded to the acidic group in the organic fine particles having cross-linking structure and acidic group.

Even when the amount of the acidic group in the organic fine particles having cross-linking structure and acidic group is more than 1 mmol/g, moisture absorptive and desorptive properties are still available provided that 1 mmol/g of metal ion is bonded thereto as mentioned above. However, many acidic groups are just present where their latent moisture absorptive and desorptive properties are not effectively utilized whereby no advantage by the presence of many acidic groups for moisture absorptive and desorptive properties is achieved. In order to reveal such an advantage, it is desirable that metal ion is bonded thereto at least in not less than 50 mol % or, preferably, not less than 70 mol % of all of the acidic groups.

As will be mentioned later, in the manufacture of the moisture absorptive and desorptive paper of the present invention, organic fine particles having cross-linking structure and acidic group which are dispersed or emulsified in water are used. In this regard, since the metal ion bonded to the acidic group in said organic fine particles is in a state of ionic bond to the acidic group, when a large amount of water is used in the so-called paper manufacturing step such as that a paper material is made into aqueous slurry of 1 to 3% by weight concentration and then diluted to 0.1 to 1% by weight followed by manufacturing paper, there is a possibility that said metal ion is exchanged for other cation existing in water. When the exchange for other ion takes place, a decrease in the moisture absorptive and desorptive properties may happen and, therefore, it is necessary to pay attention for achieving the high moisture absorptive and desorptive properties that such an exchange does not take place if at all possible.

As to a specific method therefor, when organic fine particles having cross-linking structure and acidic group are mixed with other material and made for paper, an example is a method where preparation of the aqueous slurry containing said organic fine particles, inorganic fiber and pulp-shaped fiber and manufacture of paper are carried out using water where cation concentration except metal ion bonded to the acidic group of said organic fine particles is not more than 1 ppm. When organic fine particles having cross-linking structure and acidic group are applied to the paper used as a material, an example is a method where an aqueous liquid where said organic fine particles are dispersed or emulsified in water where cation concentration except metal ion bonded to the acidic group is not more than 1 ppm is impregnated with paper comprising inorganic fiber and pulp-shaped fiber. Examples of said aqueous liquid are emulsion and suspension of the organic fine particles having cross-linking structure and acidic group.

The water mentioned hereinabove where concentration of cation except metal ion bonded to acidic group is not more than 1 ppm means water where sum of concentrations of cation other than sodium ion is not more than 1 ppm when, for example, sodium ion is bonded to acidic group of the organic fine particles. When water as such is used, exchange of metal ion bonded to the acidic group for other cation can be made minimum. On the contrary, when water such as that used for industry where cation is contained as much as 50 to 100 ppm is used, exchange for other cation takes place to some extent and, therefore, the desired moisture absorptive and desorptive properties may not be achieved in some cases.

With regard to water where concentration of cation except metal ion bonded to the acidic group is not more than 1 ppm, it is recommended to use distilled water or deionized water. When such water is used, influence on moisture absorptive and desorptive properties is little and industrial utilization is easy as well. Incidentally, in the present invention, deionized water stands for water where electric conductivity is not more than 3 μS/cm. In the case of 3 μS/cm, total cation concentration is usually about 0.6 ppm. Not only distilled water or deionize water, it is also possible to use water which contains only the same ion as metal ion bonded to the acidic group.

In the organic fine particles having cross-linking structure and acidic group in accordance with the present invention, polymers constituting the organic fine particles are bonded each other by means of the cross-linking structure and, therefore, it is possible to suppress the swelling upon moisture absorption. There is no particular limitation for the type of said cross-linking structure and examples thereof are a cross-linking structure which is formed by addition of a multi-functional monomer such as divinylbenzene upon polymerization and a cross-linking structure which is formed by the reaction with a multi-functional compound such as hydrazine and ethylene glycol diglycidyl ether after polymerization. With regard to the particle size of said organic fine particles when they are mixed and made into paper, that where an average particle size is within 1 to 50 μm is preferred in view of holding the fine particles to the paper.

A preferred example of the organic fine particles having cross-linking structure and acidic group is moisture absorptive and desorptive fine particles of an acrylate type where fine particles of acrylonitrile type polymer are subjected to an introducing treatment of cross-linking by a hydrazine type compound and a hydrolyzing treatment with alkali metal salt. In said fine particles, adjustment of amount of cross-linking structure and amount of carboxyl group are relatively easy and it is also possible that much amount of carboxyl group is contained therein and, therefore, a flexible correspondence to moisture absorptive and desorptive properties and dimensional stability which are required for moisture absorptive and desorptive paper is possible. As hereunder, said moisture absorptive and desorptive fine particles of an acrylate type will be illustrated in detail.

With regard to fine particles of polymer of an acrylonitrile type which are fine particle materials for the moisture absorptive and desorptive fine particles of an acrylate type, fine particles which are formed from a copolymer of an acrylonitrile type containing not less than 40% by weight, preferably not less than 50% by weight or, still more preferably, not less than 80% by weight of acrylonitrile homopolymer or acrylonitrile may be adopted. With regard to the monomer which is to be copolymerized with acrylonitrile, there is no particular limitation therefor but that may be appropriately selected.

Said fine particles of polymer of an acrylonitrile type may be in a form of dry powder or of emulsion. Even in the case of emulsion, it is still possible to subject the emulsion per se to the treatment which will be mentioned later. In that case, when deionized water is used as water from the stage where fine particles of an acrylonitrile type polymer are polymerized, it is possible to easily suppress the exchange of the above-mentioned metal ion bonded to the acidic group for other cation.

Fine particles of an acrylonitrile type polymer is subjected to a treatment for introduction of cross-link by a hydrazine type compound. In the treatment as such, a cross-linking structure is formed by the reaction of nitrile group of fine particles of an acrylonitrile type polymer with amino group of the hydrazine type compound and the amount of nitrogen in the fiber increases. Such an increase in the nitrogen amount may be a yardstick for the degree of cross-linking and, when that is adopted for the moisture absorptive and desorptive paper of the present invention, it is preferred to be 1.0 to 10% by weight.

With regard to a method for the adjustment of the increase in nitrogen amount to an extent of 1.0 to 10% by weight, a method where the above-mentioned fine particles of acrylonitrile type polymer is treated in an aqueous solution in which concentration of the hydrazine type compound is 5 to 60% by weight at the temperature of 50 to 120° C. for not longer than 5 hours is preferred from an industrial view.

There is no particular limitation for the hydrazine type compound used here and examples thereof are hydrazine derivatives such as hydrazine hydrate, hydrazine sulfate, hydrazine hydrochloride, hydrazine hydrobromide and hydrazine carbonate, and compounds having plural amino groups such as ethylenediamine, guanidine sulfate, guanidine hydrochloride, guanidine phosphate and melamine.

With regard to fine particles which were subjected to a cross-link introducing treatment by a hydrazine type compound, they may be also treated with acid after the hydrazine type compound remained in said treatment is fully removed. There is no particular limitation for the acid used therefor and examples thereof are mineral acids such as nitric acid, sulfuric acid and hydrochloric acid and organic acids. There is also no particular limitation for the condition for treating with the acid and an example thereof is that the fine particles to be treated are dipped in an aqueous solution containing 3 to 20% by weight or, preferably, 7 to 15% by weight of acid at the temperature of 50 to 120° C. for 0.5 to 10 hour(s).

Fine particles which were subjected to an introducing treatment of cross-link by a hydrazine type compound or which were further subjected to an acidic treatment are then subjected to a hydrolyzing treatment by alkaline metal salt. As a result of the hydrolyzing treatment, nitrile group which did not participate in the introducing treatment of cross-link by a hydrazine type compound but remained therein or, in case an acidic treatment was conducted after the introducing treatment of cross-link, the remained nitrile group and amide group which is produced by a partial hydrolysis with the acidic treatment are converted to carboxyl group and said carboxyl group becomes a state of being bonded to metal ion corresponding to the alkaline metal salt used.

Examples of the alkaline metal salt used here are alkali metal hydroxide, alkali earth metal hydroxide and alkali metal carbonate and, with regard to metal species, examples thereof are alkali metal such as Li, Na and K and alkali earth metal such as Mg and Ca.

Amount of carboxyl group produced by the hydrolyzing treatment is 1 to 10 mmol/g, preferably 3 to 10 mmol/g and, more preferably, 3 to 8 mmol/g. When amount of the carboxyl group is less than 1 mmol/g, sufficient moisture absorptive and desorptive properties may not be achieved while, when it is more than 10 mmol/g, there may be the case where swelling upon moisture absorption becomes vigorous and dimensional stability of moisture absorptive and desorptive paper becomes insufficient.

Conditions for the hydrolyzing treatment may be appropriately adjusted so that a necessary amount of carboxyl group is produced and a method for treating in an aqueous solution of alkaline metal salt of a concentration of preferably 0.5 to 10% by weight or, more preferably, 1 to 5% by weight at the temperature of 50 to 120° C. for 1 to 10 hour(s) is preferred from an industrial view. Nitrile group may or may not remain in the fine particles subjected to the hydrolyzing treatment. When the nitrile group remains, there is a possibility of giving further function utilizing its reactivity.

Fine particles subjected to the hydrolyzing treatment may be subjected, if necessary, to a treatment for adjusting the metal ion to be bonded to carboxyl group using metal salt. Metal species of the metal salt adopted for such a metal ion adjusting treatment are selected from Li, Na, K, Ca and Mg and the particularly recommended ones are Na, K and Ca. With regard to the type of the salt used for said treatment, anything may be used so far as it is a water-soluble salt of the metals as such and its examples are hydroxide, halide, nitrate, sulfate and carbonate. To be more specific, preferred representative examples for each metal are NaOH and $Na_2CO_3$ for Na salt, KOH for K salt and $Ca(OH)_2$, $Ca(NO_3)_2$ and $CaCl_2$ for Ca salt.

With regard to metal ion to be bonded to carboxyl group of the moisture absorptive and desorptive fine particles of an acrylate type, it is preferred to be sodium ion if a saturated moisture adsorptive amount is to be made high or to be potassium ion if moisture absorptive and desorptive speed is to be made high.

In addition to the cross-link introducing treatment using a hydrazine type compound, acidic treatment, hydrolyzing treatment with an alkali metal salt and metal ion adjusting treatment as mentioned above, the moisture absorptive and desorptive fine particles of an acrylate type may be further subjected to other treatment or may be subjected to both cross-link introducing treatment and hydrolyzing treatment.

Another preferred example of organic fine particles having cross-linking structure and acidic group is fine particles having cross-linking structure by divinylbenzene and having carboxyl group. There is no particular limitation for the process of producing said fine particles and its examples are a method where divinylbenzene is made to react with organic polymer having functional group so as to form cross-linking structure, and the carboxyl group is formed by a hydrolyzing reaction and a method where divinylbenzene and a vinyl monomer having carboxyl group is subjected to a graft polymerization or the like, although a method where divinylbenzene, a vinyl monomer having carboxyl group or a monomer having functional group which is able to be converted to carboxyl group and, if necessary, other vinyl monomer are copolymerized is easily utilized in terms of easy control of degree of cross-linking and amount of carboxyl group. Such a method will be illustrated as hereunder.

There is no particular limitation for the amount of divinylbenzene used therefor and it may be set so that dimensional stability and moisture absorptive and desorptive properties of the moisture absorptive and desorptive paper become desired values. Usually however, the amount is preferred to be 3 to 40% by weight to the total monomers used. When the amount is less than 3% by weight, swelling of the fine particles upon moisture absorption becomes vigorous whereby dimensional stability of the moisture absorptive and desorptive paper lowers while, when it is more than 40% by weight, amount of carboxyl group becomes little whereby sufficient moisture absorptive and desorptive properties may not be achieved.

Examples of the vinyl monomer having carboxyl group are acrylic acid, methacrylic acid, maleic acid, itaconic acid and vinylpropionic acid and lithium salt, sodium salt, potassium salt and ammonium salt thereof while examples of the monomer having functional group which is able to be converted to carboxyl group are acrylonitrile, methyl acrylate and methyl methacrylate and one kind of them or plural kinds of them may be used. Incidentally, when a monomer having functional group which is able to be converted to carboxyl group is used, carboxyl group is produced by such a means where fine particles prepared by polymerization are subjected to a hydrolyzing treatment.

With regard to the amount of such a monomer, it is preferred to use within such an extent that the carboxyl group in the resulting fine particles becomes 1 to 10 mmol/g, preferably 3 to 10 mmol/g or, more preferably, 3 to 8 mmol/g. When the amount of carboxyl group is less than 1 mmol/g, there may be the case where no sufficient moisture absorptive and desorptive properties is available while, when it is more than 10 mmol/g, there may be the case where swelling upon moisture absorption becomes vigorous and dimensional stability of the moisture absorptive and desorptive paper becomes insufficient.

Although there is no particular limitation for the polymerization method, it is preferred to use a method by suspension polymerization (pearl polymerization) or suspension precipitation polymerization as a method for preparing powdery fine particles while, as a method for preparing fine particles in a form of emulsion, it is preferred to use a method by emulsion polymerization. In the case of the emulsion polymerization, it is preferred to polymerize using deionized water or the like in view of suppression of exchange of metal ion bonded to the above-mentioned acidic group for other cation.

Like in the case of moisture absorptive and desorptive fine particles of an acrylate type, carboxyl group of the fine particles having carboxyl group and cross-linking structure by divinylbenzene produced by the above-mentioned method may, if necessary, be subjected to a treatment for adjusting the metal ion to be bonded to carboxyl group using metal salt. When a saturated moisture absorptive amount is to be made high, it is preferred to make into sodium ion while, when moisture absorptive and desorptive speed is to be made high, it is preferred to make into potassium ion.

As hereinabove, illustration was made for organic fine particles having cross-linking structure and acidic group. Even in the case of organic fine particles having cross-linking structure and acidic group as mentioned above, changes in size happen to some extent depending upon moisture absorption and desorption and upon heating. Accordingly, in the present invention, inorganic fiber is used together as a means for achieving a high dimensional stability. Inorganic fiber has very little changes in size by moisture absorption and desorption and by heating and is very effective in improving the dimensional stability of moisture absorptive and desorptive paper. There is no particular limitation for the inorganic fiber as such and its examples are glass fiber, carbon fiber, alumina fiber and metal fiber.

In the moisture absorptive and desorptive paper of the present invention, pulp-shaped fiber is further used in addition to organic fine particles having cross-linking structure and acidic group and to inorganic fiber. When pulp-shaped fiber is not used, entangling of fibers becomes insufficient and constraint between each fiber becomes loose whereby the above-mentioned effect of dimensional stability of the inorganic fiber is hardly available and, in some cases, it is difficult to make into paper. There is no particular limitation for said pulp-shaped fiber and it is possible to adopt wood pulp such as coniferous pulp and broadleaf tree pulp, non-wood pulp such as hemp pulp, cotton pulp and kenaf pulp and a fibrillated product of synthetic fiber such as rayon, Vinylon and acrylic. Particularly when acrylic pulp is adopted, waterproof property increases as compared with the cellulose type pulp and paper having high strength when water is contained therein is able to be prepared whereby that is suitable for the use where durability against repeated moisture absorption and desorption is demanded.

As hereinabove, organic fine particles having cross-linking structure and acidic group, inorganic fiber and pulp-shaped fiber which are constituting components of the moisture absorptive and desorptive paper of the present invention are mentioned. With regard to the ratio of each constituting component used, it is preferred that, usually, the organic fine particles having cross-linking structure and acidic group is 5 to 80% by weight, the inorganic fiber is 10 to 40% by weight and the pulp-shaped fiber is 10 to 55% by weight. When the ratio is out of those ranges, there may be the case where high moisture absorptive and desorptive properties and high dimensional stability are not compatible each other.

When still higher dimensional stability is desired, it is also possible to use a thermally adhesive fiber in addition to the above-mentioned constitution. There is no particular limitation for the thermally adhesive fiber and it is possible to adopt synthetic fiber such as polyester, polyethylene, polypropylene, polyamide and Vinylon. However, when the thermally adhesive fiber is mixed with organic fine particles having cross-linking structure and acidic group for making paper, it may lower the moisture absorptive and desorptive properties by, for example, covering said organic fine particles in case thermal adhesion is conducted by heating and drying. Further, when an aqueous liquid of the organic fine particles having cross-linking structure and acidic group is impregnated, there may be the case where thermally adhesive fiber of a polyester type hardly adheres to said organic fine particles, or where strength of paper lowers due to water absorption upon impregnation of the thermally adhesive fiber of a Vinylon type and the paper is deformed upon heating and drying resulting in lowering of the property. Therefore, a sufficient carefulness is necessary in using the thermally adhesive fiber and, if possible, it is desirable not to use it. Even when it is obliged to use it, it is preferred to suppress its using amount to an extent of not more than 20% by weight, more preferably not more than 10% by weight and, still more preferably, not more than 5% by weight.

In addition to the above-mentioned organic fine particles having cross-linking structure and acidic group, inorganic fiber, pulp-shaped fiber and thermally adhesive fiber, it goes without saying that the moisture absorptive and desorptive paper of the present invention may also use other natural fiber, synthetic fiber, etc.

The saturated moisture absorptive rate of the moisture absorptive and desorptive paper of the present invention is preferred to be not less than 15% or, more preferably, not less than 20% under the atmosphere of 20° C./65% RH. When the saturated moisture absorptive rate is lower than 15%, the product is not so useful as a moisture absorptive and desorptive paper. With regard to the swelling rate of the moisture absorptive and desorptive paper of the present invention in water, it is preferred to be not more than 50% or, more preferably, not more than 40%. When the swelling rate in water is more than 50%, changes in size upon moisture absorption and moisture desorption become too big and there are many fields of use where the product is unable to be used. With regard to the thermal shrinkage rate, it is desired to be not more than 5%, preferably not more than 3% and, more preferably, not more than 2%. When the thermal shrinking rate is more than 5%, utilization of it as a molded product such as moisture absorptive element for air conditioners for removal of moisture may become difficult. Incidentally, saturated moisture absorptive rate, swelling rate in water and thermal shrinking rate used in the present invention are those which are measured by the measuring methods which will be mentioned later.

Now, general method for the manufacture of the moisture absorptive and desorptive paper of the present invention will be illustrated as follows. Firstly, organic fine particles having cross-linking structure and 1 to 10 mmol/g of acidic group where not less than 1 mmol/g of metal ion of at least one kind of metal selected from the group consisting of Li, Na, K, Mg and Ca is bonded to said acidic group, inorganic fiber and pulp-shaped fiber are uniformly mixed and dispersed in water to prepare aqueous slurry. Said slurry is then made into paper using a paper manufacturing machine such as a machine of circular net, short net, long net or a composition thereof. After making into paper, it is dried using a common drier such as cylinder drier, yankee drier or air drier to prepare the moisture absorptive and desorptive paper of the present invention. With regard to water used for the aqueous slurry and the paper manufacturing step, water where concentration of cation excluding the metal ion bonded to acidic group is not more than 1 ppm as mentioned already is used and the use of deionized water or distilled water is particularly preferred.

When the organic fine particles having cross-linking structure and acidic group are in a form of an aqueous liquid (for example, when they are dispersed or emulsified in water or when said organic fine particles are inherently emulsion), it is possible to manufacture the moisture absorptive and desorptive paper of the present invention by such a manner that said aqueous liquid is impregnated with the paper comprising inorganic fiber and pulp-shaped fiber previously manufactured by a common paper manufacturing method followed by drying. There is no particular limitation for the impregnation method at that time and a method such as dipping, spraying and coating may be adopted. With regard to water forming the aqueous liquid, water where concentration of cation excluding the metal ion bonded to acidic group is not more than 1 ppm as mentioned already is used and the use of deionized water or distilled water is particularly preferred.

Incidentally, even when the organic fine particles having cross-linking structure and acidic group are in a form of emulsion, it is possible to make into paper together with other paper materials such as inorganic fiber and pulp-shaped fiber as mentioned above after making into flocky by coagulation with a coagulating agent or the like.

Examples of other manufacturing method are a method where the above-mentioned organic fine particles having cross-linking structure and acidic group are added to a starting liquid for spinning of fiber, the mixture is spun to give fiber containing said fine particles and the resulting fiber is used as a material for making into the moisture absorptive and desorptive paper of the present invention and a method where the fiber to which the above-mentioned organic fine particles having cross-linking structure and acidic group are adhered is used as a material for the manufacture of the moisture absorptive and desorptive paper of the present invention.

In the manufacture of paper in the above-illustrated manufacturing method, it is also acceptable that other fiber and thickener, sizing agent, dye, paper force enhancing agent, etc. which are used for common wet type paper manufacture are added to the aqueous slurry. It is also possible that, if necessary, a fixing agent may be added to the aqueous slurry in order to suppress the flowing-away of the excipients. Examples of the fixing agent are modified polyethyleneimine, modified polyacrylamide, sodium alginate, gum arabic, soluble starch, aluminum sulfate and aluminum potassium sulfate.

EXAMPLES

The present invention will now be more specifically illustrated by way of the following Examples although they are merely for exemplification and the gist of the present invention is not limited thereby. The terms "part(s)" and "%" in the Examples are those by weight unless otherwise mentioned. Deionized water used in the Examples is that where cation concentration is 0.6 ppm. Method for measurement and method for evaluation used in the Examples will be shown as hereunder.

(1) Amount of Acidic Group (Total Amount of Carboxyl Group)

About 1 g of well-dried sample is precisely weighed (W1 [g]), 200 ml of water is added thereto, the mixture is adjusted to pH 2 by addition of a 1 mol/l aqueous solution of hydrochloric acid under warming at 50° C. and then a titration curve is determined according to a conventional method using a 0.1 mol/l aqueous solution of sodium hydroxide. From said titration curve, amount of the sodium hydroxide solution (V1 [ml]) consumed for carboxyl group is determined and then total amount of carboxyl group (A1 [mmol/g]) is calculated by the following formula:

Total amount of carboxyl group [mmol/g]=$0.1 \times V1/W1$ (2) Amount of Metal Ion-Bonded Carboxyl Group A titration curve is also determined in a similar manner without adjusting to pH 2 by addition of a 1 mol/l aqueous solution of hydrochloric acid in the above-mentioned operation for the measurement of total carboxyl group amount and the amount of H type carboxyl group (COOH) (A2 [mmol/g]) contained in the sample is determined. From those results, amount of metal ion-bonded carboxyl group is calculated by the following formula:

Amount of metal ion-bonded carboxyl group [mmol/g]=$A1-A2$ (3) Amount of Metal Ion Well-dried sample is precisely weighed and subjected to a wet degradation and amount of metal ion is determined by means of an atomic absorption method.

(4) Saturated Moisture Absorption Rate

The sample (about 5.0 g) is absolutely dried and its weight is measured (W2 [g]). Then said sample is placed in a constant-moisture vessel of 20° C./65% RH for 24 hours. Weight of the sample which absorbed moisture as such is measured (W3 [g]). From the above measuring results, calculation is done by the following formula:

Saturated moisture absorption rate [%]=$\{(W3-W2)/W2\} \times 100$ (5) Swelling Rate in Water The sample is absolutely dried and thickness is measured (T1). Said sample is dipped in water for 24 hours and dehydrated for 2 minutes by a centrifugal dehydrating machine (Type H-770A manufactured by Kokusan Enshinki K. K.) at a centrifugal rate of acceleration of 160 G (G is gravitational acceleration) and thickness is measured again (T2). From those measured values, calculation is done by the following formula:

Swelling rate in water [%]=$\{(T2-T1)/T1\} \times 100$ (6) Thermal Shrinking Rate A sample cut in a square is placed in a constant-moisture vessel of 20° C./65% RH for 24 hours and then longitudinal and transverse sizes (L1, L2) are measured. After that, said sample is kept under the condition of 105° C. for 30 minutes and longitudinal and transverse sizes are measured again (L3, L4). From those measured values, calculation is done by the following formula:

Thermal shrinking rate [%]=$\{(L1+L2)-(L3+L4)\}/(L1+L2) \times 100$

Method of preparation of the organic fine particles having cross-linking structure and acidic group used in the Examples is as follows.

<Organic Fine Particles A Having Cross-Linking Structure and Acidic Group>

Acrylonitrile (390 parts), 100 parts of divinylbenzene, 16 parts of sodium p-styrenesulfonate and 1,181 parts of deionized water were placed in an autoclave, di-tert-butyl peroxide was further added thereto as a polymerization initiator in an amount of 0.5% to the total amount of the monomers, the autoclave was tightly closed and the mixture was polymerized with stirring at the temperature of 150° C. for 23 minutes. After completion of the reaction, the mixture was cooled to about 90° C. with stirring to give an emulsion of material fine particles (a). To the emulsion of the material fine particles (a) was added sodium hydroxide so as to make its concentration in the bath 1% and the mixture was hydrolyzed at 102° C. for 5 hours, placed in a cellulose tube and dialyzed and desalted using deionized water for one week to give organic fine particles A in a form of emulsion having cross-linking structure and acidic group. In said organic fine particles A, average particle size was 0.4 µm, amount of acidic group was 2.1 mmol/g, amount of metal ion-bonded carboxyl group was 1.5 mmol/g and amount of sodium ion was 1.5 mmol/g.

<Organic Fine Particles B Having Cross-Linking Structure and Acidic Group>

The same method as in the case of the organic fine particles A having cross-linking structure and acidic group was conducted except that, in the hydrolyzing treatment of the emulsion of the material fine particles (a), potassium hydroxide was added so as to Make its concentration in the bath 3%, whereupon organic fine particles B having cross-linking structure and acidic group were prepared. In said organic fine particles B, average particle size was 0.6 µm, amount of acidic group was 5.8 mmol/g, amount of metal ion-bonded carboxyl group was 4.9 mmol/g and amount of potassium ion was 4.8 mmol/g.

<Organic Fine Particles C Having Cross-Linking Structure and Acidic Group>

The same method as in the case of the organic fine particles A having cross-linking structure and acidic group was conducted except that, in the hydrolyzing treatment of the emulsion of the material fine particles (a), potassium hydroxide was added so as to make its concentration in the bath 10%, whereupon organic fine particles C having cross-linking structure and acidic group were prepared. In said organic fine particles C, average particle size was 0.9 µm, amount of acidic group was 9.2 mmol/g, amount of metal ion-bonded carboxyl group was 7.3 mmol/g and amount of sodium ion was 7.5 mmol/g.

<Organic Fine Particles D Having Cross-Linking Structure and Acidic Group>

Acrylonitrile (490 parts), 16 parts of sodium p-styrenesulfonate and 1,181 parts of deionized water were placed in an autoclave, di-tert-butyl peroxide was further added thereto as a polymerization initiator in an amount of 0.5% to the total amount of the monomers, the autoclave was tightly closed and the mixture was polymerized with stirring at the temperature of 150° C. for 23 minutes. After completion of the reaction, the mixture was cooled to about 90° C. with stirring to give an emulsion of material fine particles (d). To the emulsion of the material fine particles (d) was added hydrazine so as to make its concentration in the bath 35% and a cross-linking treatment was conducted at 102° C. for 2.5 hours. After that, sodium hydroxide was added thereto so as to make its concentration in the bath 10% and the mixture was hydrolyzed at 102° C. for 5 hours, placed in a cellulose tube and dialyzed and desalted using deionized water for one week to give organic fine particles D in a form of emulsion having cross-linking structure and acidic group. In said organic fine particles D, average particle size was 0.3 µm, amount of acidic group was 5.9 mmol/g, amount of metal ion-bonded carboxyl group was 4.4 mmol/g and amount of sodium ion was 4.5 mmol/g.

<Organic Fine Particles E Having Cross-Linking Structure and Acidic Group>

A water-soluble polymer (300 parts) in which methacrylic acid/sodium p-styrenesulfonate was 70/30 and 30 parts of sodium sulfate were dissolved in 6,595 parts of water and placed in a polymerization vessel equipped with a stirrer of a paddle type. After that, 15 parts of 2,2'-azobis(2,4-dimethylvaleronitrile) was dissolved in 2,700 parts of methyl acrylate and 300 parts of divinylbenzene, placed in a polymerization vessel and subjected to a suspension polymerization at 60° C. for 2 hours under a stirring condition of 400 rpm to give material fine particles (e) in a polymerization rate of 87%. Said material fine particles (100 parts) were dispersed in 900 parts of deionized water, 100 parts of sodium hydroxide was added thereto, the mixture was subjected to a hydrolyzing treatment at 90° C. for 2 hours and the resulting polymer was washed with deionized water, dehydrated and dried to give organic fine particles E having cross-linking structure and acidic group. In said organic fine particles E, average particle size was 45 µm, amount of acidic group was 4.7 mmol/g, amount of metal ion-bonded carboxyl group was 3.7 mmol/g and amount of sodium ion was 3.9 mmol/g.

Examples 1 to 5 and Comparative Examples 1 and 2

An aqueous slurry comprising inorganic fiber, pulp-shaped fiber and binder fiber in a ratio as shown in Table 1 was prepared and made into paper using a square-shaped sheet machine manufactured by Kumagai Riki Kogyo Co., Ltd. and the paper was sandwiched between filter papers and dried at 145° C. using a rotary drier manufactured by Kumagai Riki Kogyo Co., Ltd. to prepare a material paper. Said material paper was dipped in organic fine particles having cross-linking structure and acidic group in a form of emulsion of the concentration shown in Table 1 and, after squeezing out the excessive emulsion, it was dried at 120° C. to give moisture absorptive and desorptive paper. Amount of adhered organic fine particles was determined for the resulting moisture absorptive and desorptive paper and swelling rate in water and thermal shrinking rate were measured as yardsticks of dimensional stability while saturated moisture absorptive rate was measured as a yardstick for moisture absorptive and desorptive property.

Result of evaluation for Examples 1 to 5 and Comparative Examples 1 and 2 is shown in Table 1. Details of the inorganic fiber, the pulp-shaped fiber and the thermally adhesive fiber in the table are as follows.

Glass fiber—fiber diameter: 6 µm; fiber length: 6 mm

Bi-PUL—acrylic pulp manufactured by Japan Exlan Company Limited; degree of water filtration adopted in Canada as a standard: 150 ml Coniferous kraft pulp—degree of water filtration adopted in Canada as a standard: 600 ml VPB-105—Vinylon binder fiber manufactured by Kurary; fineness: 1T; fiber length: 3 mm

TABLE 1

| | | | Example 1 | | Example 2 | | Example 3 | | Example 4 | | Example 5 | | Comparative Example 1 | | Comparative Example 2 | |
|---|---|---|---|---|---|---|---|---|---|---|---|---|---|---|---|---|
| Material paper | Inorganic fiber | % | Glass fiber | 50 | Glass fiber | 43 | Glass fiber | 43 | Glass fiber | 43 | Glass fiber | 43 | — | 0 | — | 0 |
| | Pulp-shaped fiber | % | Bi-PUL | 50 | Bi-PUL | 50 | Bi-PUL | 50 | Coniferous kraft pulp | 50 | Bi-PUL | 50 | Bi-PUL | 100 | Bi-PUL | 33 |

TABLE 1-continued

|  |  |  | Example 1 | Example 2 | Example 3 | Example 4 | Example 5 | Comparative Example 1 | Comparative Example 2 |
|---|---|---|---|---|---|---|---|---|---|
|  | Thermally adhesive fiber | % | — 0 | VPB-105 7 | VPB-105 7 | VPB-105 7 | VPB-105 7 | — 0 | VPB-105 67 |
|  | Emulsion of organic fine particles (Concentration) | % | A 20 | B 18 | C 12 | B 18 | D 18 | B 18 | A 20 |
|  | Amount of adhered organic fine particles (to moisture absorptive and desorptive paper) | % | 72 | 64 | 32 | 68 | 65 | 69 | 64 |
| Result of evaluation | Swelling rate in water [%] |  | 22 | 33 | 30 | 39 | 36 | 58 | 12 |
|  | Thermal shrinking rate [%] |  | 0.7 | 1.2 | 0.9 | 2.3 | 1.5 | 6.3 | 0.4 |
|  | Saturated moisture absorption rate [%] |  | 16.6 | 26.9 | 22.7 | 29.1 | 29.3 | 29.0 | 14.7 |

All of the moisture absorptive and desorptive papers of Examples 1 to 5 were with low swelling rate in water and thermal shrinking rate and with high saturated moisture absorption rate. On the contrary, in Comparative Example 1, although the amount of the pulp-shaped fiber was increased, no inorganic fiber was used and that would be the cause for the outcome that swelling in water was unable to be sufficiently suppressed and thermal shrinking rate increased as well. In Comparative Example 2, although paper was able to be prepared, strength of the paper upon impregnation with the emulsion was low due to an increase in the amount of the thermally adhesive fiber of a Vinylon type and, in addition, the paper was distorted as a result of heating and drying after impregnation whereby the product was not suitable for practical use.

Example 6 and Comparative Examples 3 and 4

Fine particles, inorganic fiber, pulp-shaped fiber and thermally adhesive fiber in the ratio as shown in Table 2 were dispersed in deionized water for Example 6 and Comparative 4 while, for Comparative Example 3, they were dispersed in industrial water to prepare aqueous slurries of 0.5% concentration. Each of the aqueous slurries was made into paper using a square-shaped sheet machine manufactured by Kumagai Riki Kogyo Co., Ltd., sandwiched between filter papers and dried at 145° C. using a rotary drier manufactured by Kumagai Riki Kogyo Co., Ltd. to prepare moisture absorptive and desorptive paper. The resulting moisture absorptive and desorptive paper was subjected to measurement of swelling rate in water, thermal shrinking rate and saturated moisture absorptive rate. Results of evaluation for Example 6 and Comparative Examples 3 and 4 are shown in Table 2.

TABLE 2

|  |  |  | Example 6 | Comparative Example 3 | Comparative Example 4 |
|---|---|---|---|---|---|
| Material paper | Inorganic fiber | % | Glass fiber 21.5 | Glass fiber 21.5 | Glass fiber 21.5 |
|  | Pulp-shaped fiber | % | Bi-PUL 25 | Bi-PUL 25 | Bi-PUL 25 |
|  | Thermally adhesive fiber | % | VPB-105 3.5 | VPB-105 3.5 | VPB-105 3.5 |

TABLE 2-continued

|  |  |  | Example 6 | Comparative Example 3 | Comparative Example 4 |
|---|---|---|---|---|---|
|  | Fine particles | % | Organic fine particles E having cross-linking structure and acidic group 50 | Organic fine particles E having cross-linking structure and acidic group 50 | Silica gel: average particle size 40 μm 50 |
| Result of evaluation | Swelling rate in water [%] |  | 28 | 20 | 2 |
|  | Thermal shrinking rate [%] |  | 1.1 | 1.0 | 0.8 |
|  | Saturated moisture absorption rate [%] |  | 20.7 | 13.5 | 12.2 |

Although the organic fine particles E having cross-linking structure and acidic group used in Example 6 was powdery, they gave moisture absorptive and desorptive paper having low swelling rate in water and thermal shrinking rate and high saturated moisture absorptive rate the same as in the cases of Examples 1 to 5. On the contrary, although the fiber constitution of the moisture absorptive and desorptive paper of Comparative Example 3 was entirely same as that of Example 6, the paper was with low saturated moisture absorptive rate. It is probably affected by the fact that, due to its preparation using industrial water, ion exchange took place between cation in the industrial water and sodium ion of the organic fine particles E having cross-linking structure and acidic group. In Comparative Example 4, silica gel which was inorganic particles was used instead of the organic fine particles E having cross-linking structure and acidic group but no sufficient saturation moisture absorptive rate was achieved.

The invention claimed is:

1. A method for manufacture of moisture absorptive and desorptive paper, wherein the method includes a step for preparation of an aqueous slurry and a step for manufacture of paper by using said aqueous slurry by a wet method, wherein said aqueous slurry contains organic fine particles having a cross-linking structure and 1 to 10 mmol/g of acidic group where not less than 1 mmol/g of metal ion of at least one kind of metal selected from the group consisting of Li, Na, K, Mg and Ca is bonded to said acidic group, inorganic fiber and pulp-shaped fiber selected from the group consisting of wood pulp, non-wood pulp and fibrillated synthetic fiber, and wherein the step for preparation of an aqueous slurry and the step for manufacture of paper are conducted with water where the concentration of cations excluding the metal ions bonded to said acidic group is not more than 1 ppm.

2. A method for the manufacture of moisture absorptive and desorptive paper, wherein paper comprising inorganic fiber and pulp-shaped fiber selected from the group consisting of wood pulp, non-wood pulp and fibrillated synthetic fiber is treated with aqueous liquid in which organic fine particles having a cross-linking structure and 1 to 10 mmol/g of acidic group, where not less than 1 mmol/g of metal ion of at least one kind of metal selected from the group consisting of Li, Na, K, Mg and Ca is bonded to said acidic group, are dispersed or emulsified in water where the concentration of cations excluding metal ions bonded to said acid group is not more than 1 ppm, wherein the organic fine particles adhere to the paper.

3. Moisture absorptive and desorptive paper obtained by the method of claim 1 or 2, which paper comprises organic fine particles having a cross-linking structure and 1 to 10 mmol/g of acidic group where not less than 1 mmol/g of metal ion of at least one kind of metal selected from the group consisting of Li, Na, K, Mg and Ca is bonded to said acidic group (hereinafter, that may be referred to as organic fine particles having cross-linking structure and acidic group), inorganic fiber and pulp-shaped fiber selected from the group consisting of wood pulp, non-wood pulp and fibrillated synthetic fiber, wherein said paper has a saturated moisture absorbing rate under the atmosphere of 20° C./65% RH of not less than 15%.

4. The moisture absorptive and desorptive paper according to claim 3, wherein the organic fine particles having the cross-linking structure and the acidic group are moisture absorptive and desorptive fine particles of an acrylate type formed by subjecting fine particles of a polymer of an acrylonitrile type a treatment for introduction of cross-links by a hydrazine type compound and to a hydrolyzing treatment by an alkali metal salt.

5. The moisture absorptive and desorptive paper according to claim 3, wherein formed is the cross-linking structure by divinylbenzene and the acidic group is a carboxyl group.

6. The moisture absorptive and desorptive paper according to claim 3, wherein the pulp-shaped fiber is a fibrillated acrylic fiber.

7. The moisture absorptive and desorptive paper according to claim 3, wherein the paper contains a thermally adhesive fiber in an amount not more than 20% by weight.

8. The moisture absorptive and desorptive paper according to claim 3, wherein the swelling rate in water is not more than 50%.

9. The moisture absorptive and desorptive paper according to claim 3, wherein a thermal shrinking rate is not more than 5%.

10. The moisture absorptive and desorptive paper according to claim 3, wherein the paper contains 5-80% by weight of the organic fine particles, 10-40% by weight of the inorganic fiber, and 10-55% by weight of the pulp-shaped fiber.

* * * * *